(12) United States Patent
McCord et al.

(10) Patent No.: US 8,957,342 B2
(45) Date of Patent: Feb. 17, 2015

(54) SEALED SOLENOID MAGNETICALLY OPERATED HIGH VOLTAGE ELECTRIC POWER SWITCH

(71) Applicants: Neil McCord, Hampton, GA (US); Joseph R. Rostron, Hampton, GA (US); Frank Blalock, Hampton, GA (US); Donald Swing, Hampton, GA (US); Roy Alexander, Cranberry Trap, PA (US); Kent Davey, Edgewater, FL (US); William Horn, Norcorss, GA (US)

(72) Inventors: Neil McCord, Hampton, GA (US); Joseph R. Rostron, Hampton, GA (US); Frank Blalock, Hampton, GA (US); Donald Swing, Hampton, GA (US); Roy Alexander, Cranberry Trap, PA (US); Kent Davey, Edgewater, FL (US); William Horn, Norcorss, GA (US)

(73) Assignee: Southern States LLC, Hampton, GA (US)

( * ) Notice: Subject to any disclaimer, the term of this patent is extended or adjusted under 35 U.S.C. 154(b) by 0 days.

(21) Appl. No.: 14/104,875

(22) Filed: Dec. 12, 2013

(65) Prior Publication Data
US 2014/0158665 A1    Jun. 12, 2014

Related U.S. Application Data

(60) Provisional application No. 61/736,018, filed on Dec. 12, 2012.

(51) Int. Cl.
*H01H 9/42* (2006.01)
*H01H 9/04* (2006.01)
*H01H 33/16* (2006.01)

(52) U.S. Cl.
CPC ............... *H01H 9/04* (2013.01); *H01H 33/168* (2013.01); *Y02E 30/40* (2013.01)
USPC ........................... 218/143; 335/185; 335/202

(58) Field of Classification Search
USPC .......................... 218/143–144; 335/185, 202
See application file for complete search history.

(56) References Cited

U.S. PATENT DOCUMENTS

| | | | |
|---|---|---|---|
| 4,608,470 A * | 8/1986 | Bischofberger et al. | ...... 218/143 |
| 5,705,781 A | 1/1998 | Habedank | |
| 8,274,007 B2 | 9/2012 | Blalock | |
| 2005/0067380 A1 | 3/2005 | Rhein | |

FOREIGN PATENT DOCUMENTS

| | | |
|---|---|---|
| EP | 2312606 A1 | 4/2011 |
| JP | 2010-262840 A | 11/2010 |

OTHER PUBLICATIONS

ISR Issued in PCT/US2013/074774 Mar. 27, 2014.

* cited by examiner

*Primary Examiner* — Ramon Barrera
(74) *Attorney, Agent, or Firm* — Mehrman Law Office; Michael J. Mehrman

(57) ABSTRACT

A sealed solenoid, magnetically operated electric power switch is suitable for use as capacitor, line and load switch operating at transmission and distribution voltages that includes no dynamically moving seals through the sealed container housing the contactor portion of the switch. The sealed solenoid switch includes a magnetically operated drive system with an actuator that magnetically couples across the container wall to avoid the use of a moving or sliding seal as part of the drive system. The sealed solenoid switch may also include a ballast resistor and resistor contact located inside the sealed container to avoid another seal as part of the ballast system. A magnetic latch holds the switch in a closed position, and a spring holds the switch in the closed position, to avoid the need for an energizing current to maintain the switch in either position.

20 Claims, 15 Drawing Sheets

SEALED SOLENOID MAGNETICALLY OPERATED HIGH VOLTAGE ELECTRIC POWER SWITCH

PRIORITY CLAIM

This application claims priority to U.S. Provisional Patent Application Ser. No. 61/736,018 filed Dec. 12, 2012, entitled "Sealed Solenoid Magnetically Operated Electric Power Switch" which is incorporated by reference.

TECHNICAL FIELD

The present invention is directed to electric power systems and, more particularly, to a sealed solenoid magnetically operated electric power switch suitable as a capacitor, line and load switch for transmission and distribution voltages.

BACKGROUND

Conventional capacitor, line and load switches for transmission and distribution voltages include sophisticated mechanical drive systems with latches that drive contactors that are typically housed within sealed containers. The drive systems typically include spring-loaded toggle system and mechanical latches triggered by hand or an electronic control system. Because the drive system is fairly large, this portion of the switch is located outside the sealed container housing the contactor portion of the switch. This necessitates an opening through the sealed container and an associated moving or sliding seal allowing a mechanical connection between the drive system located outside the sealed container and the contactor located inside the container. The seal is often exposed to the weather, subject to wear, and presents a potential point of failure requiring inspection and occasional replacement.

The conventional capacitor switch arrangement also includes a ballast resistor typically located outside the sealed container that is temporarily connected in the circuit as the switch is opened or closed to suppress initial charging and discharging current spikes and transients of the capacitor as the switch is initially opened or closed. Similar current spikes and transients also occur when switching inductive load currents during line and load switching operations. Like the drive mechanism, the ballast resistor is typically located outside the sealed container requiring another opening through the container and associated seal.

The conventional arrangement described above for capacitor, line and load switches operating at transmission and distribution voltages is physically large compared to the sealed container itself, mechanically complex, requires one or more seals through the container, and is correspondingly expensive from acquisition and operation standpoints. There is, therefore, a continuing need for smaller, simpler, more durable, and more economical solution to capacitor, line and load switching.

SUMMARY OF THE INVENTION

The invention solves the problems described above through a sealed solenoid, magnetically operated, high voltage electric power switch that is suitable for use as capacitor, line and load switch operating at transmission and distribution voltages that includes no dynamically moving seals through the sealed container housing the contactor portion of the switch. The sealed solenoid switch includes a magnetically operated drive system with an actuator that magnetically couples across the container wall to avoid the use of a moving or sliding dielectric seal and a mechanical component extending through the seal as part of the drive system. A magnetic latch holds the switch in a closed position, and a return spring holds the switch in the closed position, to avoid the need for an energizing current to maintain the switch in either position.

The sealed solenoid switch may also include a ballast resistor and a resistor contact located inside the sealed container containing the dielectric gas to avoid the need for a dielectric seal and a mechanical component extending through the seal as part of the ballast system. To facilitate this configuration, the ballast resistor may be annular with a central channel mounted concentrically around at least a portion of the stationary main contact. The resistor contact, which is typically located adjacent to the ballast resistor, may also be annular with a central channel mounted concentrically around at least a portion of the stationary main contact. The resistor contact may be biased toward the moving contact and configured to retract against a resistor spring as the moving contact comes into contact with the resistor contact. In addition, the resistor contact and the moving contact may be annular and similarly sized to cause the arc that forms in the arc gap between the contacts to circulate through the dielectric gas as the resistor contact and the moving contact approach and separate from each other during the closing and opening strokes, respectively.

In view of the foregoing, it will be appreciated that the present invention provides an improved high voltage switching device. The specific structures and techniques for accomplishing the advantages described above will become apparent from the following detailed description of the embodiments and the appended drawings and claims.

DETAILED DESCRIPTION OF THE EMBODIMENTS

Figure 1:
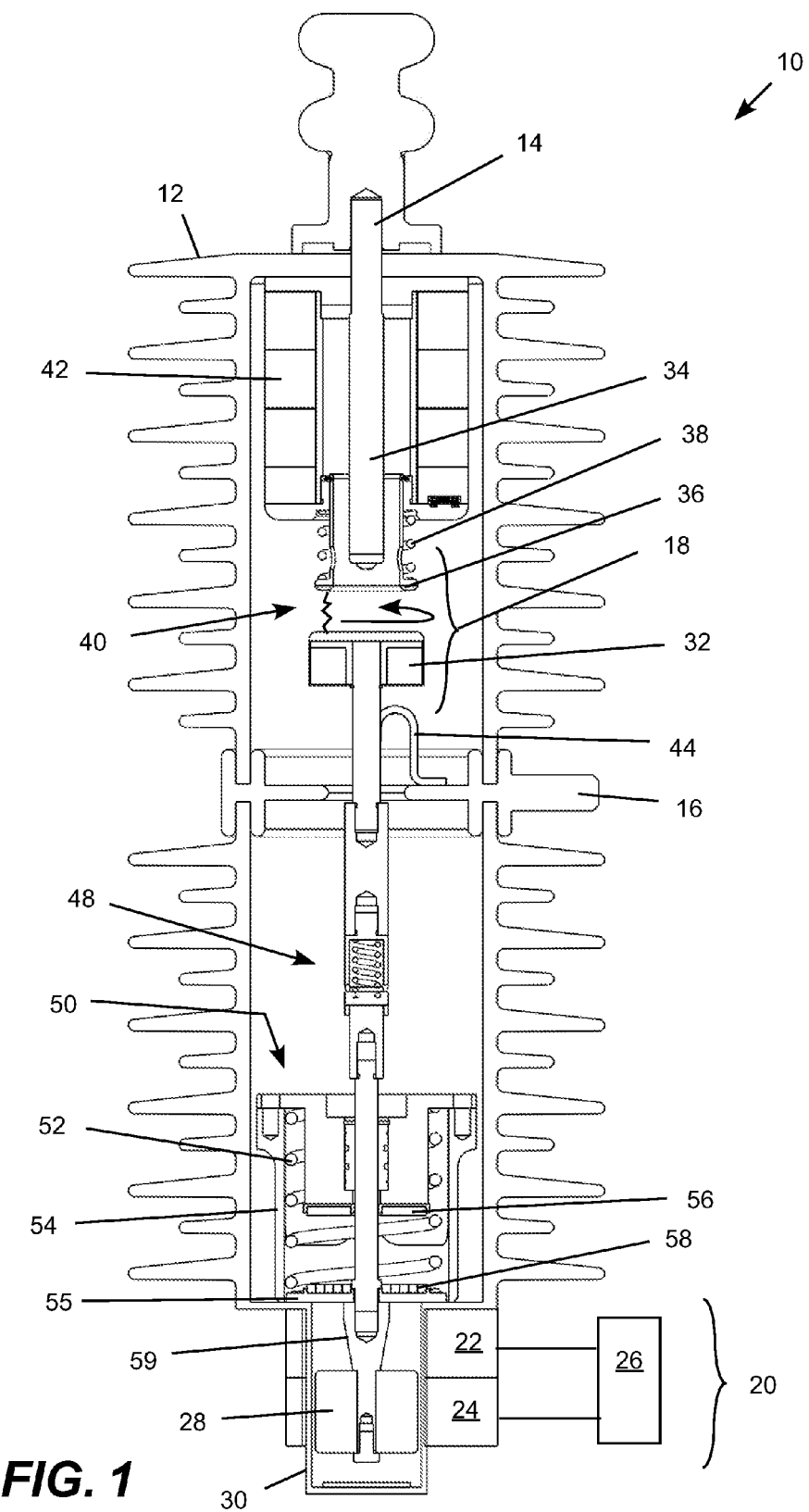
FIG. 1 is a sectional view of a sealed solenoid circuit switch in an open position.

The present invention may be embodied in a sealed solenoid, magnetically operated, high power electric power switch suitable for use as capacitor, line and load switch operating at transmission and distribution voltages. The device may be referred to as the "sealed solenoid circuit switch" or the "switch" as shorter references. The switch is particularly well suited for use as a capacitor bank switch utilizing a ballast resistor and a butt-style or penetrating-style resistor contactor located inside a sealed container containing a dielectric gas, such as Sulfur Hexaflouride (SF6) or another dielectric arc interrupting medium, as the dielectric switching medium. The switch is driven by a magnetic actuator to avoid the need for an opening and associated seal allowing a moving mechanical component to extend through a wall of the container. The switch therefore includes a magnetically operated drive system that magnetically couples an actuator located outside the sealed container containing the dielectric medium to an armature located inside the sealed container across a non-magnetizing container wall to operate the drive system. Any type of mechanical or electrical, local or remote controller may be used to activate the circuit switch.

The sealed solenoid circuit switch may also include a ballast resistor located inside the sealed container to avoid another seal as part of the ballast system. The ballast resistor is temporarily switched into the circuit to dampen switching current spikes and transients (typically voltage and current transients) during the opening and closing strokes. The ballast resistor may include a number of resistor pucks that are each annular with a hole in the center, adhered together and mounted concentrically around at least a portion of the stationary main contact, and held together by a bonding agent rather than mechanical pressure to allow the stack of resistor pucks to simply hang within the sealed container. The ballast resistor electrically connects to a moving butt contact through an annular spring housing that causes the arc formed in the spark gap between the spring housing and the butt contact to circulate. This moves the arc through the dielectric gas to help extinguish the arc to reduce the contactor speed required to extinguish the arc without a restrike. This reduces the overall size and cost of the device.

Conventional capacitor switches operating at transmission and distribution voltages using vacuum technology with butt-style contacts were frequently failing and quite often out of service. The invention solves this problem through a new design for a capacitor switch using similar butt-style contacts or penetrating-style contacts, but including closing and opening resistors and using sulfur hexafluoride (SF6) as the dielectric switching medium in order to reduce the probability and occurrence of restrikes during switching and to reduce the probability and occurrence of flashovers due to system overvoltages.

The capacitor switch is typically mounted on a fixture near a capacitor bank intended for power factor correction. An electrical shunt is used to connect the terminal on the center flange to the capacitor bank. Another electrical shunt is used to connect the terminal on the top flange to one phase of an electric power transmission system. The switch is normally open. The power supply and control circuit are connected to the user control panel by a standard wire.

To close the switch, the controller sends a signal to the control circuit indicating that the switch is to be closed. The control circuit closes a relay switch that operates an actuator by supplying current to the close coil. The magnetic field induced by the current flowing in the actuator coil acts on the armature and moves the armature and the moving contact upward against the return spring and gravity. When the moving contact reaches the resistor contact current begins to flow into the capacitor. The resistor contact is connected both electrically and mechanically to the ballast resistor. The resistor restricts initial current flows to dampen switching current spikes and transients inherent with capacitor switching. The moving contact continues upward pushing against a linear spring that is attached to the resistor contact as well as the return spring. Once the moving contact reaches the stationary main contact the ballast resistor is shorted and the full capacitance current begins to flow unrestricted into the capacitor bank. The moving contact has reached its final position at this point, but the armature continues to move upward against the return spring and begins to compress the contact force linear spring joint which, in an embodiment using a main butt-style contact, is used to resist throw-off forces induced by current flowing through the butt-style contact joint of the moving contact and the stationary main contact. The armature stops moving when the moving close-latch magnet contacts the stationary close-latch magnet. The moving close-latch magnet and the stationary close-latch magnet work together to hold the switch in the closed position against the combined load of the return spring, resistor contact spring, and contact force linear spring. The control circuit opens the relay switch which stops the flow of current into the close coil.

To open the switch, the controller sends a signal to the control circuit indicating that the switch is to be opened. The control circuit closes a relay switch that supplies current to the open coil. The magnetic field induced by the coil current acts on the armature. The combined downward force of gravity, the return spring, resistor contact spring, contact force linear spring, and the magnetic force provided by the coil current overcome the latching force provided by the close-latch magnets, and the armature begins to move downward. Once the contact force linear spring joint is fully extended the moving contact also begins to move downward and separates from the stationary main contact which breaks the unrestricted flow of current. As the moving contact continues downward current continues to flow to and from the capacitor bank albeit restricted by the resistors. Once the resistor contact is fully extended the moving contact continues to move downward under the influence of gravity and the return spring breaking the flow of current completely. As the moving contact continues to move downward away from the resistor contact and stationary main contact dielectric strength is building between them by means of the dielectric gas which allows the gap to resist restrikes caused by recovery voltage. The armature reaches its final position. The control circuit opens the relay switch which stops the flow of current into the open coil.

The sealed solenoid circuit switch is less likely to restrike or flashover than current vacuum technology used in capacitance current switching. The dielectric gas container is completely self-contained with no opportunity for gas leaks. The switch for each electric phase is a separate, independently operated unit so that the loss of one switch unit does not require replacement of a complete three-phase switch. The sealed solenoid switch also saves space in comparison to conventional devices rated for the same electrical performance and avoids the need for additional external housing structures typically used to house the ballast resistor and drive system in a conventional dielectric electrical power switch.

FIG. 1 is a sectional view of a sealed solenoid circuit switch 10 operated by a magnetic actuator 20 in an open position. This illustration is shown substantially to scale for a switch with an insulator that is approximately 35 cm long rated at 27 kV to interrupt 200 Amps. Typical operating parameters for the magnetic actuator 20 for this particular embodiment are 20 Amps at 240 Volts AC; and a 480 Volt AC actuator with a similar or somewhat lower current rating may also be suitable. It will be understood that the specific power requirements of the actuator for any particular embodiment may vary depending on the specific configuration of the switch including, for example, the length of the device, the travel distance of the moving contact, the parameters of the various springs selected, and so forth. The operating parameters for the magnetic actuator may therefore be considered to be a design parameter selected to achieve the desired non-restrike switching performance with the particular switch configuration.

As the switch 10 is a complete unit for one phase of an electric power line, a typical three phase electric power line would utilize three such switches with one connected to each power phase. A common controller is typically utilized to operate the switches, which may operate the switches independently or in combination, as appropriate for various situations. Each phase switch may also be configured to operate automatically in response to measured parameters associated with its respective phase, such as a voltage sag, power factor, over-current, or over-voltage measurement on the phase.

The switch is housed within an insulator 12 that forms an internal sealed container that houses all moving parts of the device. Placing all of the mechanical linkages inside the sealed container avoids the need for openings through the container and associated dielectric seals. The switch opens and closes a contactor located within the container to selectively complete an electric circuit that conducts a current between a line terminal 14, which is typically connected to a high voltage power line, and load terminal 16, which typically connected to a capacitor bank, line, or other circuit element. The terminals 14, 16 are selectively switched into electrical contact trough a butt or penetrating contactor 18 by a control system 20, which may be manually operated, electrically operated, locally operated, or remotely operated, and typically includes a combination of these operating modes. For example, the switch may have a manual operating lever and a local electric controller housed within an on-site electric panel, which is also connected to a remote control system through a suitable communication system (e.g., SCADA). The switch may also be configured to operate automatically in response to certain measurements associated with its respective phase line. For example, the switch may be configured to automatically switch a capacitor bank or voltage regulator into and out of connection to an electric power line in response to a voltage, current, or power factor measurement on the power line. As another example, the switch may be configured to disconnect a circuit element in response to a measured over-voltage or over-current condition on the power line.

In addition to communication and measurement equipment used to activate the switch, this embodiment of the control system 20 includes an annular close coil 22, an annular open coil 24, and a relay controller 26 that controls power to the coils to operate the switch. The coils 22, 24 are located outside the sealed container and positioned adjacent to a conductive armature 28 that is located inside the sealed container and configured to move upward and downward between upper and lower positions. The coils surround a non-magnetizing wall 30 of the sealed container that houses the armature 28 to allow the magnetic fields generated by the coils to couple with the armature. The non-magnetizing wall 30 may be a non-conductive material such as plastic, or a conductive material that does not magnetize significantly at 60 Hz such as aluminum or a range of other materials that will not conduct a significant magnetic flux and therefore will not interfere with magnetic coupling across the wall of the sealed container. The close coil 22 is positioned above the lower position of the armature 28 to drive the armature upward to its upper position to close the switch when the close coil is energized. Similarly, the open coil 24 is positioned below the upper position of the armature 28 to drive the armature downward to its lower position to open the switch when the open coil is energized.

In an embodiment utilizing a penetrating contactor, the moving contact 18 includes a moving, annular female butt-type contact 32 that forms butt contact with the resistor contact 36 and a butt or penetrating contact with the stationary contact 34. The resistor contact 36 is spring loaded, biased toward the moving contact, and configured to retract when impacted by the moving contact 32 to allow the moving contact to continue to travel upward after initially contacting the resistor contact during the closing stroke. The contactor 18 also includes a stationary, pin-type male contact 34 that selectively forms a butt contact with the moving contact or extends (penetrates) into a hole in the moving female contact. During the closing stroke, the moving contact 32 comes into contact with the resistor contact 36 before contacting the stationary contact 34 to sequence these connections to temporarily enter the ballast resistor 42 into the circuit. The reverse connection sequence occurs on the opening stroke so that the ballast resistor dampens switching current spikes and transients during both strokes.

The armature 28 is connected to the moving contact 32 to drive the moving contact upward into electrical contact with the stationary contact 34 to close an electric circuit through the switch, and to drive the moving contact downward to separate from the stationary contact to open the circuit. A retracting resistor contact 36, which also serves as a resistor spring support, is biased downward toward the moving contact by a resistor contact spring 38. The resistor contact 36 and the resistor contact spring 36 both concentrically surround at least a portion of the stationary contact 34. When the switch is in its open position, as shown in FIG. 1, the moving contact 32 is positioned below the bottom of the resistor contact 36, which is located below the bottom of the stationary contact 34 to form an arc gap 40 between the moving contact and the resistor contact.

The moving contact 32 and the resistor contact 36 are similarly sized and positioned adjacent to each other to cause an arc that forms across the arc gap 40 to circulate through the dielectric gas in the arc gap during the opening and closing strokes to assists in extinguishing the arc without a damaging restrike. To limit the arc current and reduce the chance for a restrike, the resistor contact 36 temporarily connects the ballast resistor 42 into the circuit until the moving contact 32 comes into electrical contact with the stationary contact 34, which provides a far lower resistance circuit path effectively shorting the ballast resistor. The circuit is completed by a shunt 44 that connects the moving contact 32 to the load terminal 16. The line and load terminal 14, 16, which are the only physical connections from the inside to the outside of the insulator 12, do not move during operation of the switch and therefore do not require dynamically moving seals to accommodate moving linkages through the wall of the sealed container as utilized in conventional dielectric circuit switches.

Figure 2:
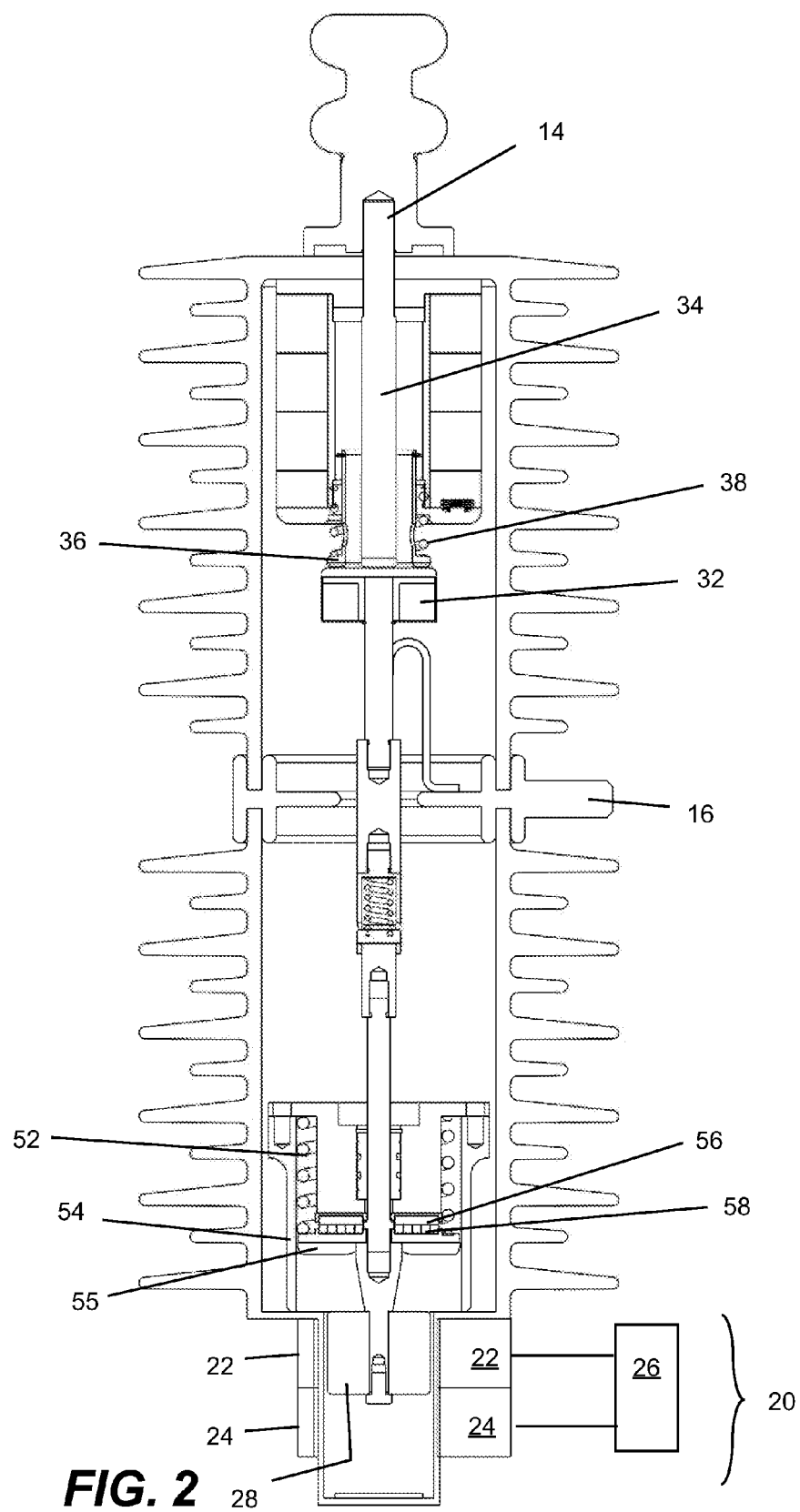
FIG. 2 is a sectional view of the sealed solenoid circuit switch in a closed position.

The switch 10 is moved to the open position shown in FIG. 1 with the armature 28, the moving contact 32, and the resistor contact 36 in their lower positions by energizing the open coil 24 with the close coil 22 de-energized. FIG. 2 is a sectional view of the sealed solenoid circuit switch 10 in the closed position. The switch is moved to the closed position with the armature 28, the moving contact 32, and the resistor contact 36 in their upper positions as shown in FIG. 2 by energizing the close coil 22 with the open coil 24 de-energized. The switch 10 may also include a linear spring joint 48 that mechanically dampens the physical impacts caused by moving contactor 32 as it is driven upward by movement of the armature 28 first into contact with the resistor contact 36 and then into contact with the stationary contact 34. As the armature 28 moves the moving contact 32 upward during the closing stroke, it loads a return spring mechanism 50, which assists in accelerating the moving contactor downward during the opening stroke.

The return spring mechanism 50 includes a return spring 52 within a stationary spring housing 54 having a movable bottom plate 55. A stationary upper latch magnet 56 is supported by the spring housing 54, while a movable second latch magnet 58 is supported by the movable bottom plate 55, which is biased downward by the return spring 52. The armature 28 is connected to the movable bottom plate 55 by a linkage 59 so that the armature moves the bottom plate up and down with the moving contact 32. As the armature moves sufficiently upward, the upper and lower latch magnets 56, 58 couple to each other to latch the armature in the upper position with the return spring 52 compressed. The latch magnets must therefore be sufficiently strong to hold the switch in the closed position (i.e., armature and moving contact in their upper positions) against the force of gravity as well as the spring force of the compressed resistor spring 36 and the compressed return spring 52. The magnetic latch may also have to overcome the spring force of the compressed linear spring joint 48 if this spring is also compressed when the contactor is in the closed position in the particular embodiment.

In the closed position shown in FIG. 2, the armature 28, the movable plate 55, the moving contact 32, and the resistor contact 36 are in their upper positions. The moving contact 32 is in electrical contact with the stationary contact 34 and the resistor contact 36. The resistor spring 36 and the return spring 52 are compressed and the linear spring joint 48 may also be compressed to some extent. The upper and lower latch magnets 56, 58 are in contact with each with sufficient magnetic coupling strength to hold the switch in this position when the close coil 22 is de-energized. It will be appreciated that the latch magnets 56, 58 couple relatively strongly when very close to each other while the magnetic force falls off quickly for example with the square of the separation distance as the latch magnets are separated providing the familiar latching characteristic associated with magnetic latches.

To drive the switch to the open position again, the open coil 24 is energized with the close coil 22 de-energized. Basically, the open coil 24 needs to supply sufficient force to unlatch the latch magnets 56, 58, which allows the armature return spring 52, the resistor spring 36, the linear spring joint 48 (to the extent it may be compressed), and gravity to assist the open coil 24 in driving the moving contact 32 downward on the opening stroke. This configuration, along with the circulating arc and ballast resistor features of the embodiment, helps the switch 10 achieve the desired contactor separation speed required to avoid a damaging restrike during the opening stroke, which is typically the limiting design constraint in a circuit switch design. The combination of all of these factors allows the sealed solenoid switch to meet this design objective in a smaller, lighter, less expensive, and more reliable design than conventional designs. The schematic sequence diagrams of FIGS. 3-13 show the electric flows occurring during the opening and closing strokes.

Figure 3:
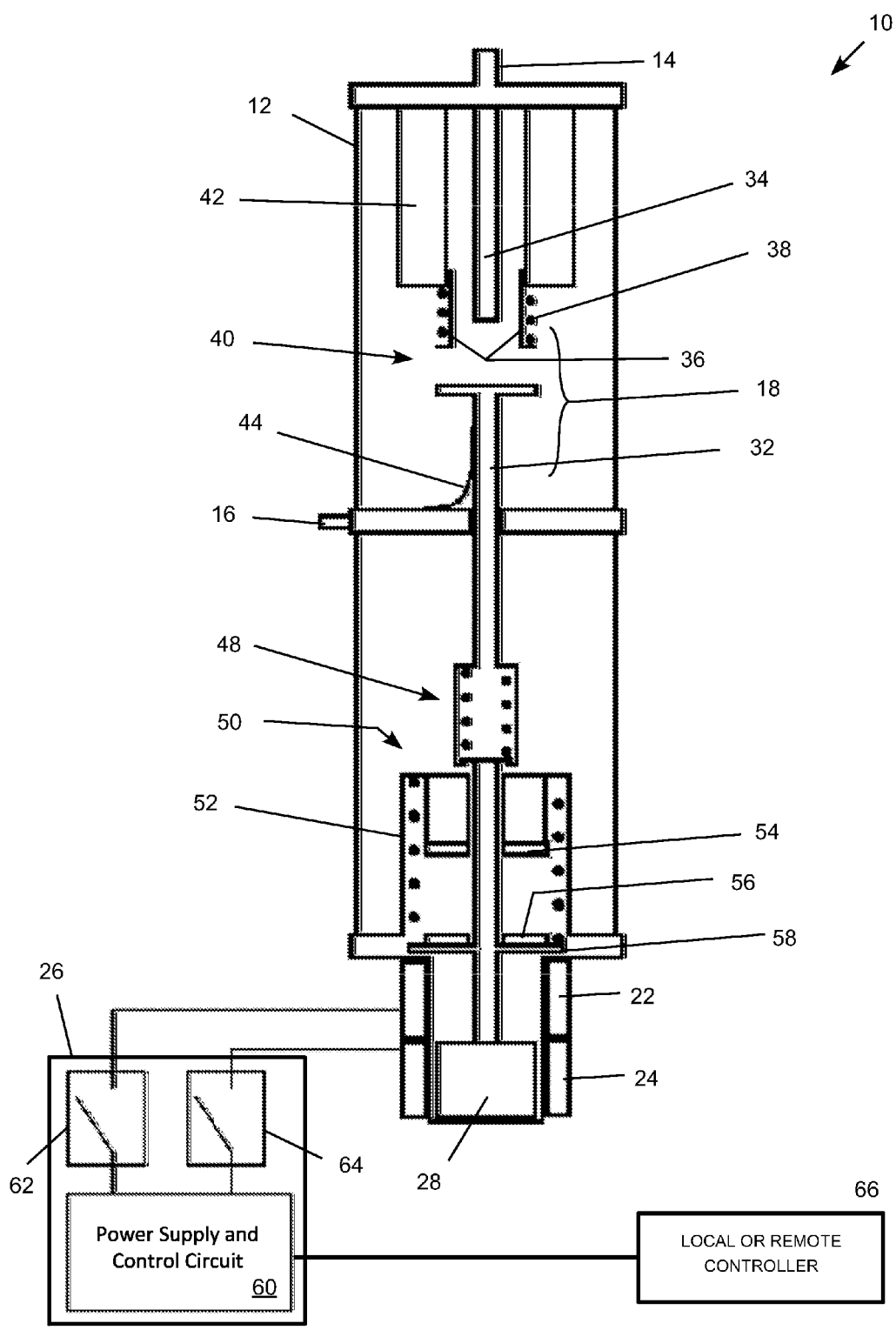
FIG. 3 is a schematic depiction of the sealed solenoid circuit switch in a fully open position.

FIG. 3 is a schematic depiction of the sealed solenoid circuit switch 10 in the fully open position. The same elements enumerated on FIG. 1 are labeled in this figure, which also show that the relay controller 26 includes a power supply and control circuit 60 that controls an open switch 62 that energizes the open coil 22, and also includes a close switch 64 that energizes the close coil 24. The control circuit 60 may be operated by any suitable manual or electrical control signal, such as the local or remote controller 66. FIG. 3 shows the switch 10 in the fully open position with the close switch 62 open to de-energize the close coil 22, and with the close switch 64 open to de-energize the open coil 24. The armature 28, moving contact 32, and the resistor contact 36 are all in their lower positions and there is no current flowing through the switch 10.

Figure 4:
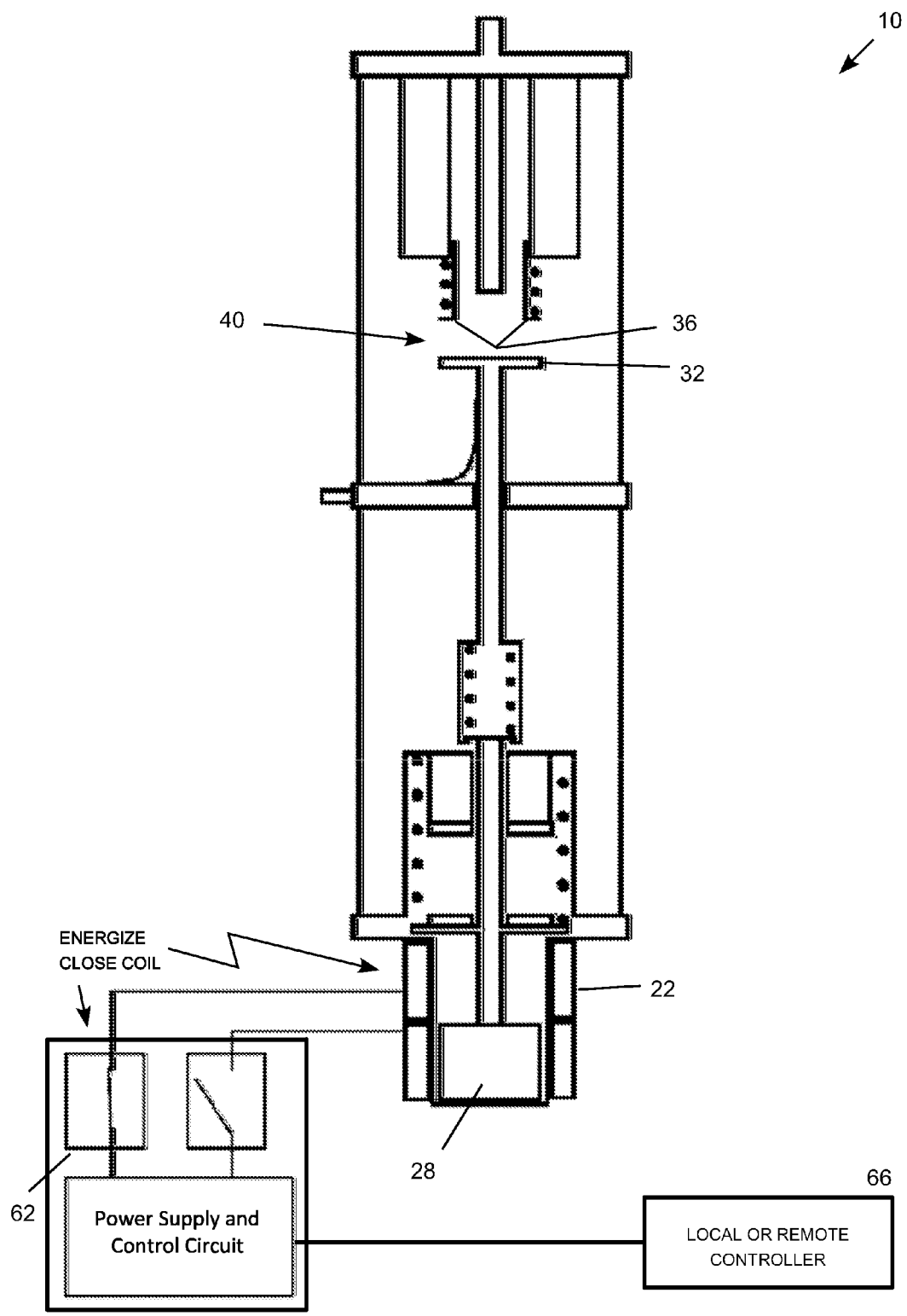
FIG. 4 is a schematic depiction of the sealed solenoid circuit switch after the closing switch has been activated.
Figure 5:
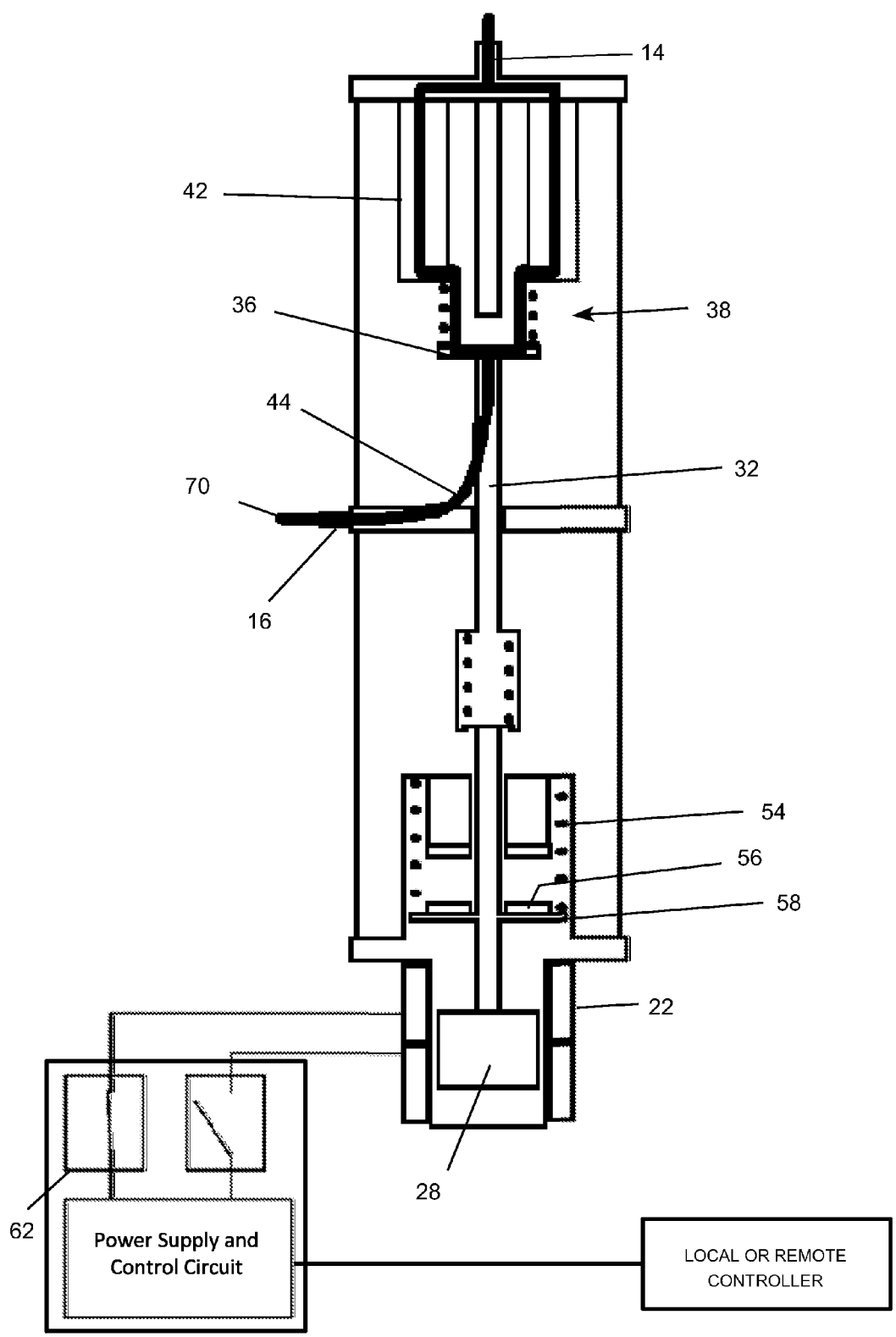
FIG. 5 is a schematic depiction of the sealed solenoid circuit switch after a first portion of movement in the closing direction.

FIG. 4 shows the first step to initiate the closing stroke, in which the close switch 62 is closed to energize the close coil 22, which magnetically pulls the armature 28 upward to begin the closing stroke. As the moving contact 32 moves upward, a spinning arc is formed in the arc gap 40 between the moving contact and the resistor contact 36 as the moving contact approaches the resistor contact. FIG. 5 shows the resistor current flow 70 that initially conducts during an initial portion of the closing stroke as the moving contact 32 approaches and then comes into contact with the resistor contact 36, but before the moving contact comes into contact with the stationary contact 34. The resistor current path 70 flows from the line terminal 14, through the ballast resistor 42, through the resistor contact 36 (and the resistor spring 38), through the moving contact 32, through the shunt 44, and through the load terminal 16. As a result, the resistor 42 is temporarily entered into the circuit during an initial portion of the closing stroke to dampen switching current spikes and transients.

Figure 6:
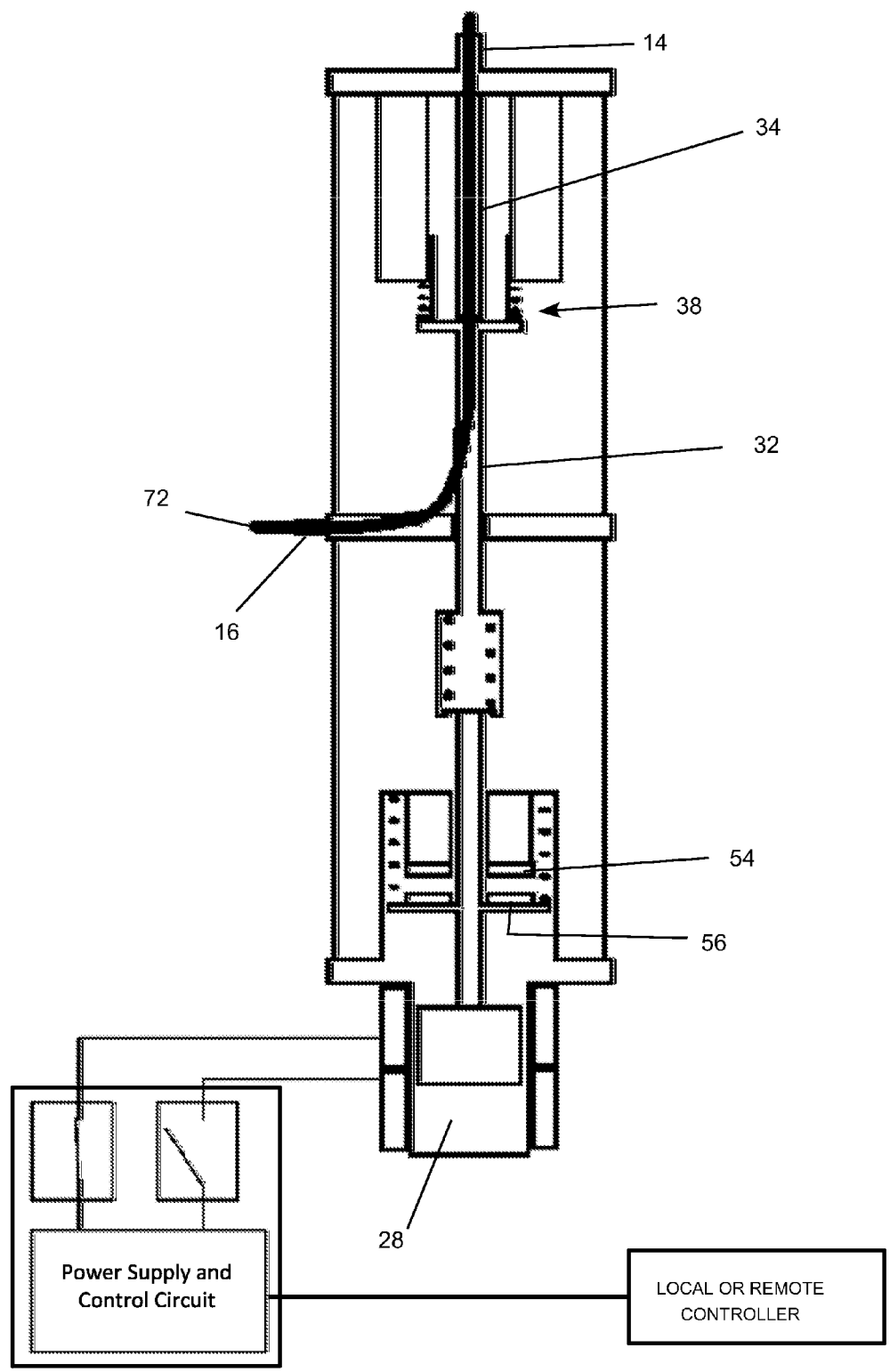
FIG. 6 is a schematic depiction of the sealed solenoid circuit switch after a second portion of movement in the closing direction.
Figure 7:
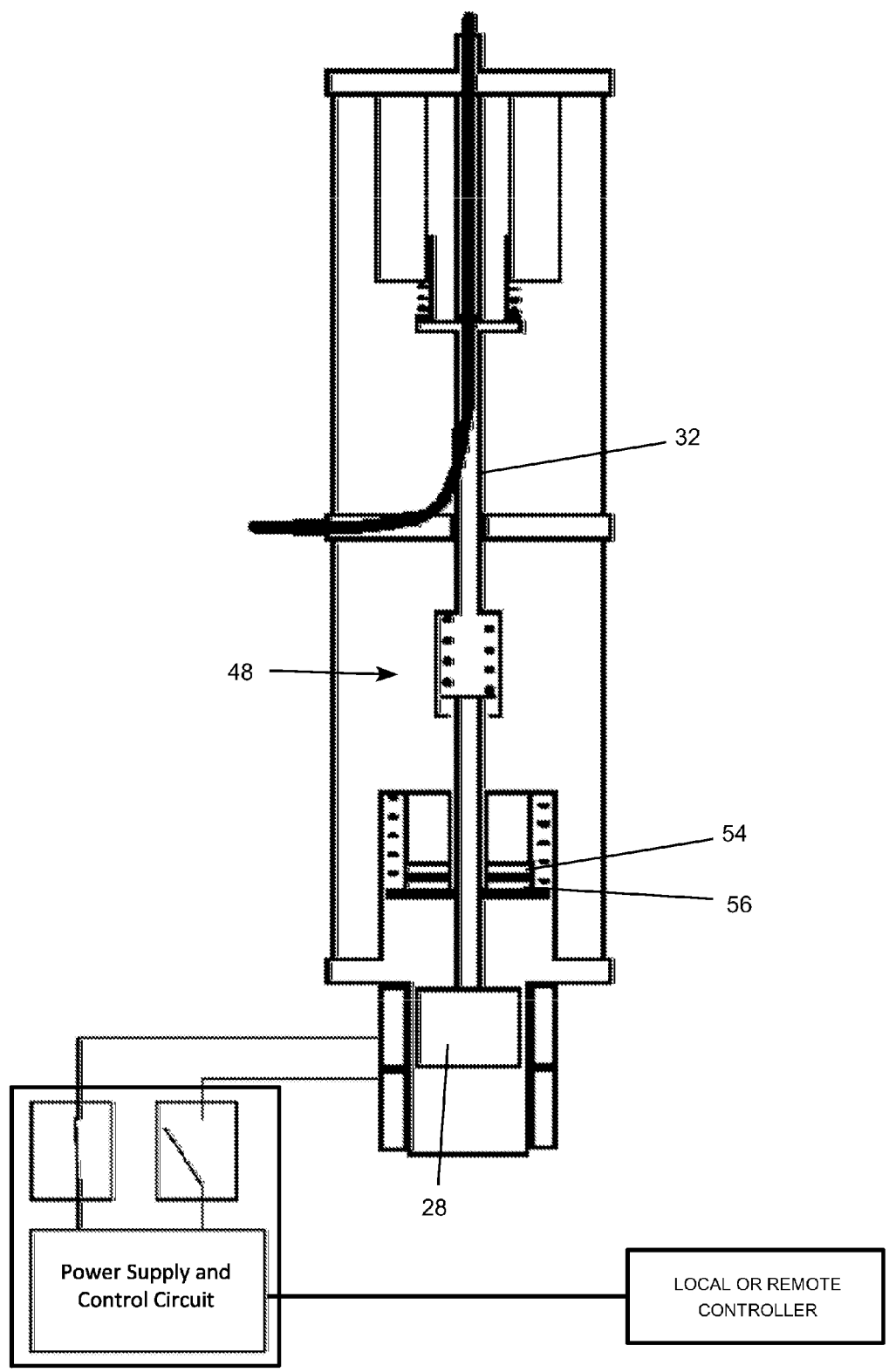
FIG. 7 is a schematic depiction of the sealed solenoid circuit switch after a third portion of movement in the closing direction.
Figure 8:
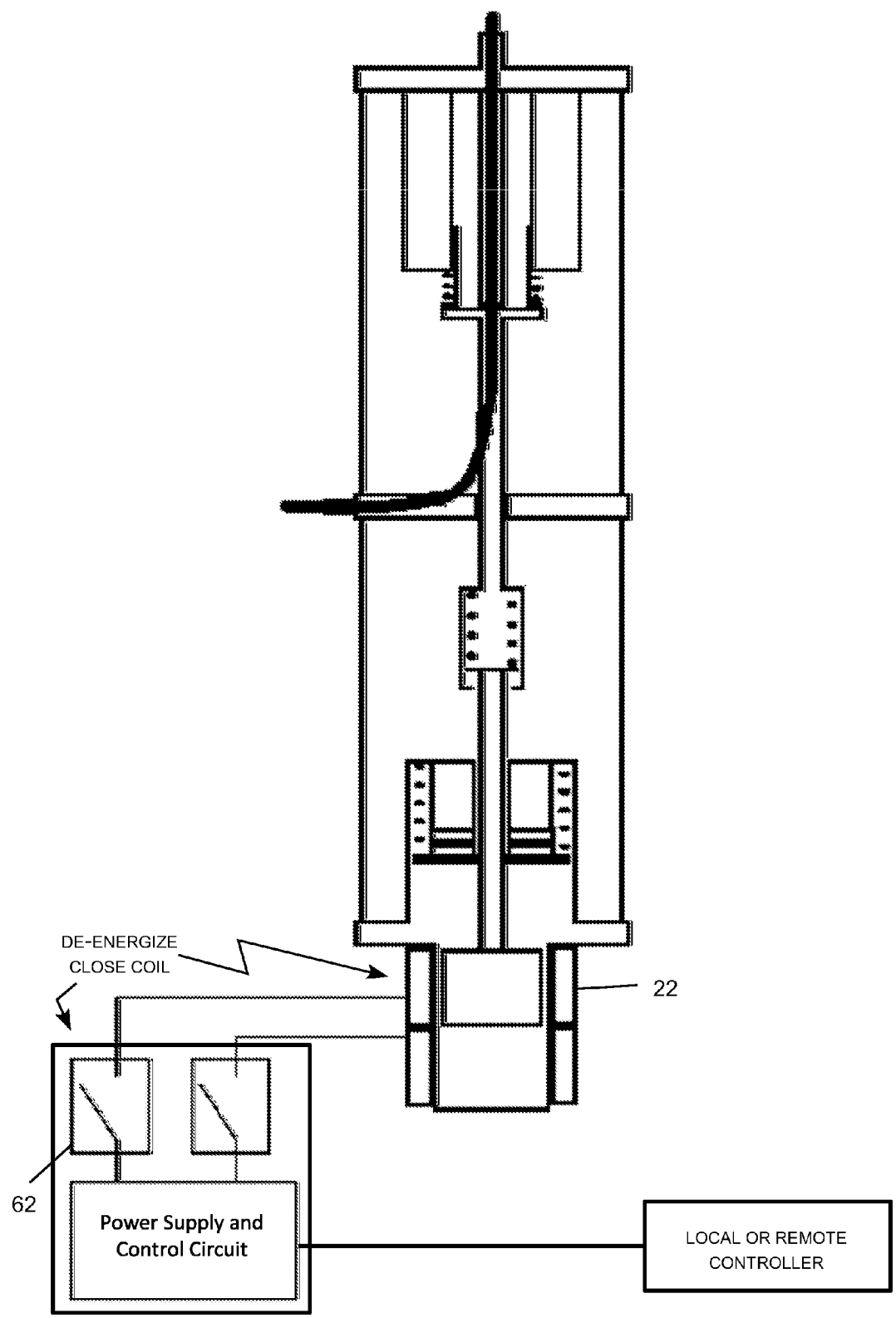
FIG. 8 is a schematic depiction of the sealed solenoid circuit switch in the fully closed position.

FIG. 6 shows the main current path 72 that forms as the moving contact 32 moves further upward into contact with the stationary contact 34, which also retracts the resistor contact 36 upward compressing the resistor spring 38. The main current path 72 flows from the line terminal 14, through the stationary contact 34, through the moving contact 32, through the shunt 44, and through the load terminal 16. Although the ballast resistor 42 and resistor contact 36 are still energized, the current flow through the resistor path is negligible due to the short around the ballast resistor caused by the far lower resistance path through the stationary and moving contacts conducting the main current flow 72. FIG. 7 shows the position of the armature 28 and the moving contact 32 at the completion of the closing stroke, where the latch magnets 54, 56 are in contact with each other. As shown in FIG. 8, the close switch 62 is then opened to de-energize the close coil 22 and leave the latch magnets 54, 56 holding the switch in the closed position without the need for an energizing current.

Figure 9:
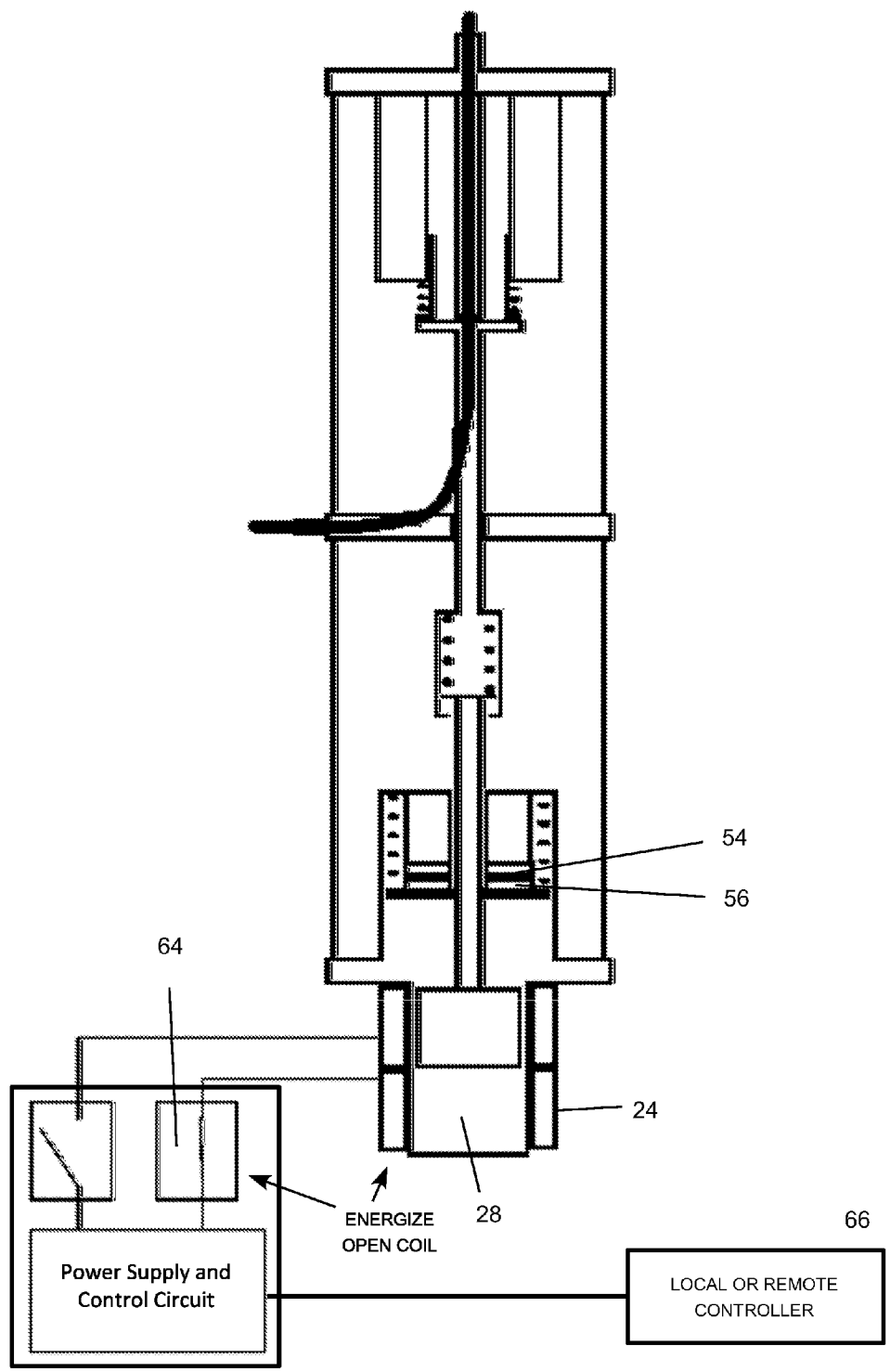
FIG. 9 is a schematic depiction of the sealed solenoid circuit switch after the opening switch has been activated.
Figure 10:
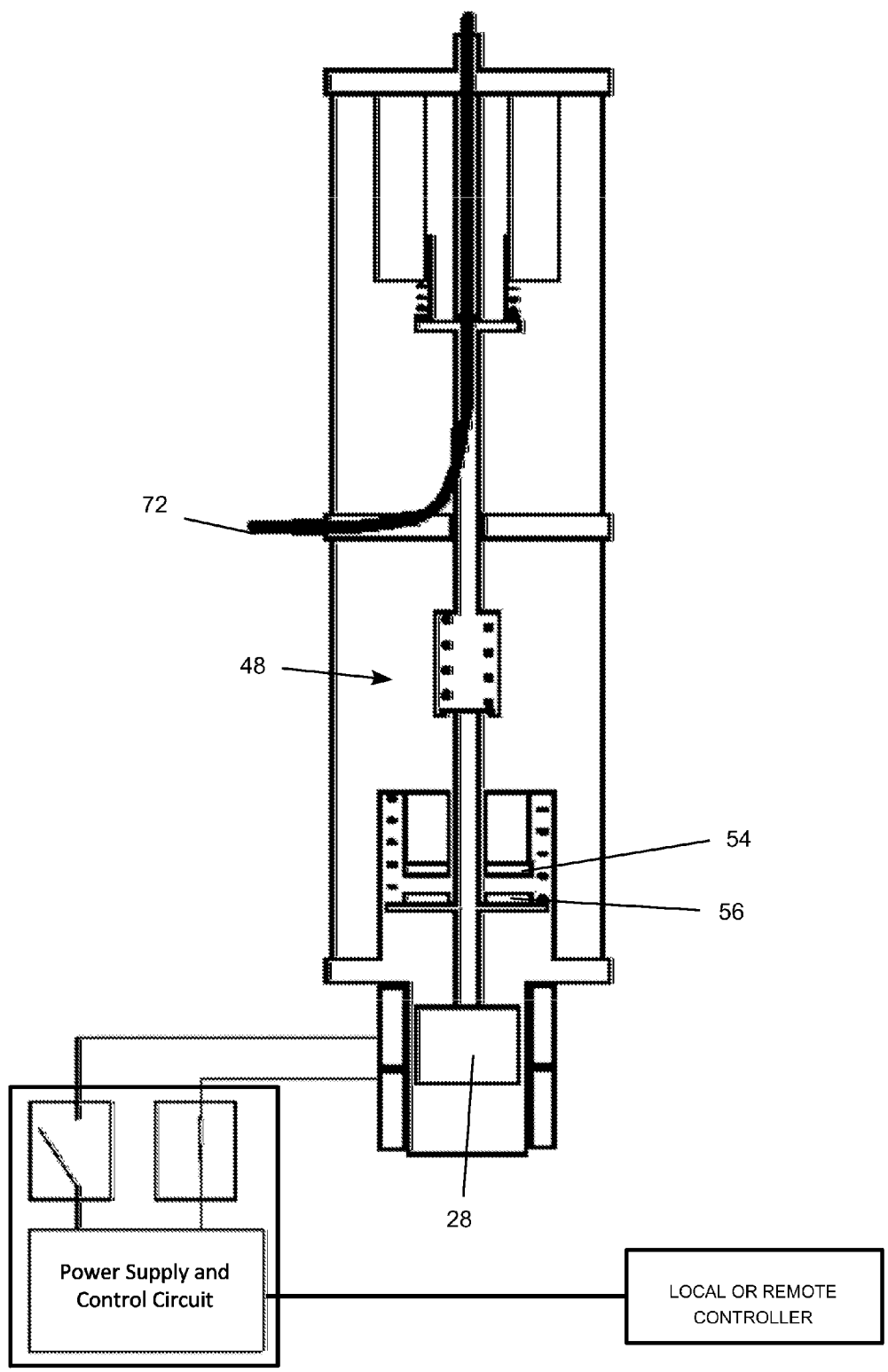
FIG. 10 is a schematic depiction of the sealed solenoid circuit switch after a first portion of movement in the opening direction.
Figure 11:
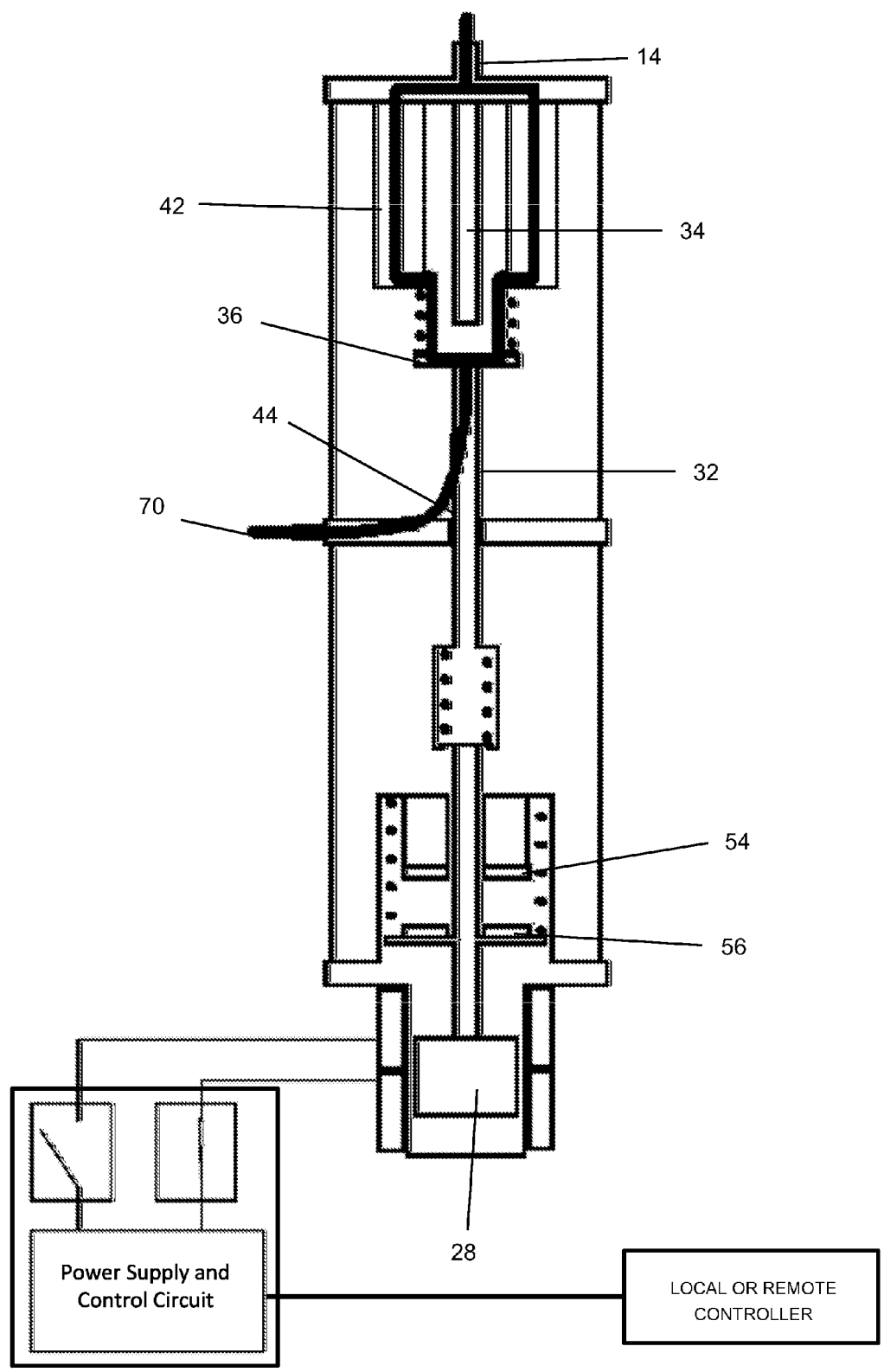
FIG. 11 is a schematic depiction of the sealed solenoid circuit switch after a second portion of movement in the opening direction.
Figure 12:
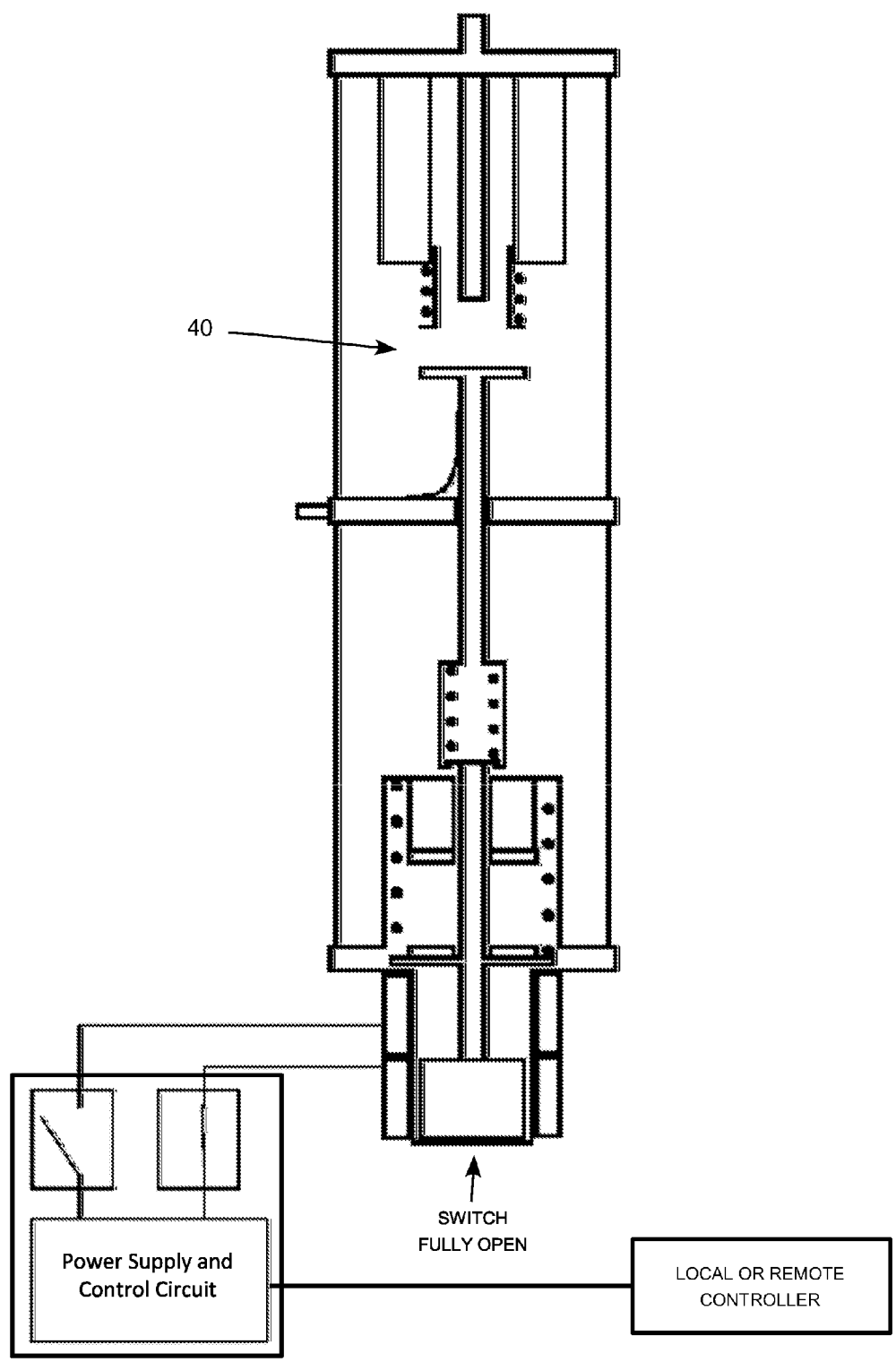
FIG. 12 is a schematic depiction of the sealed solenoid circuit switch after a third portion of movement in the opening direction.
Figure 13:
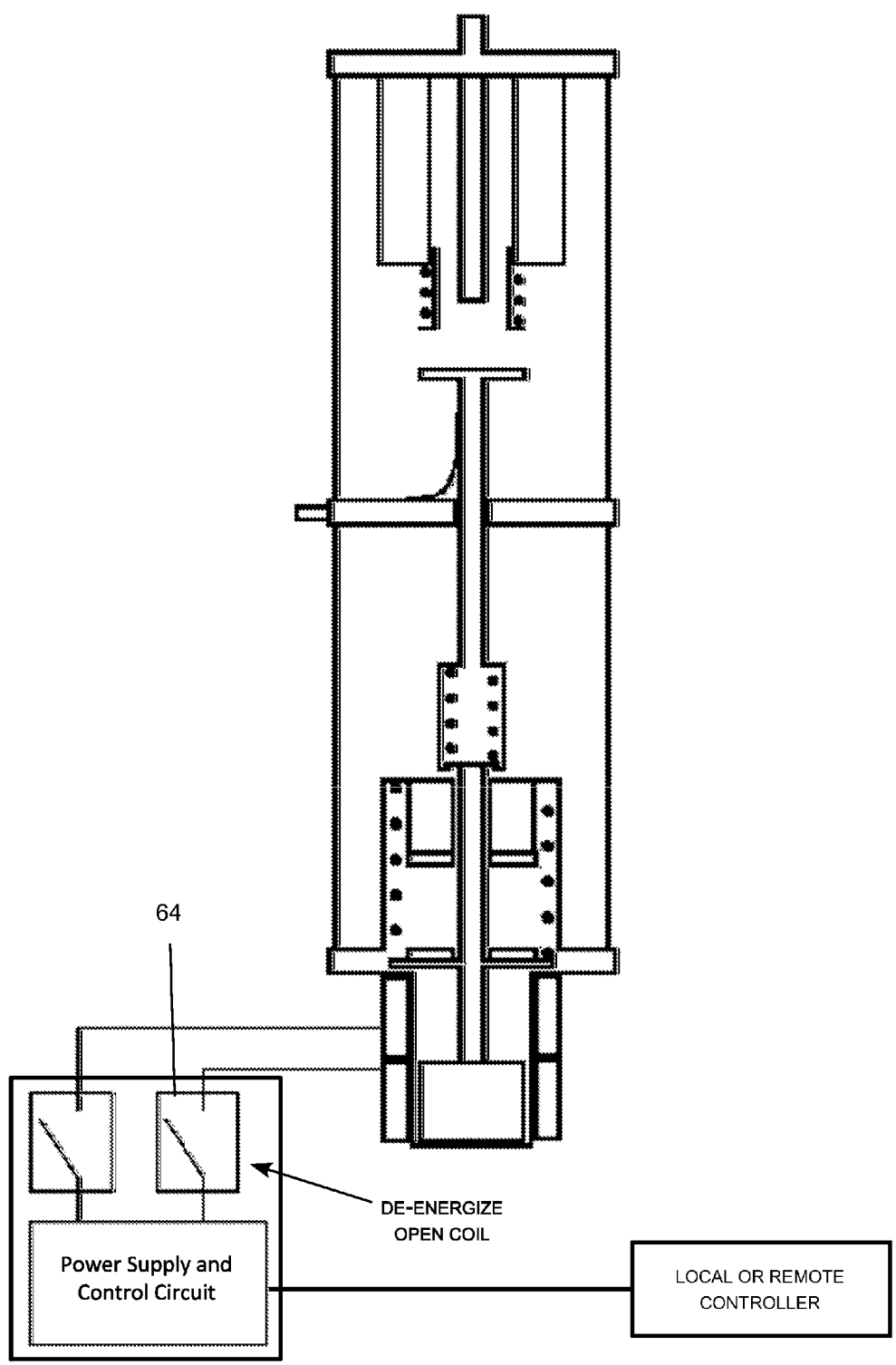
FIG. 13 is a schematic depiction of the sealed solenoid circuit switch after returning to the fully open position.

FIG. 9 shows the first step in the opening stroke, which is to close the open switch 64 to energize the open coil 24. This pulls the armature 28 downward sufficiently to unlatch the latch magnets 54, 56 as shown in FIG. 10. FIG. 11 illustrates the point when the moving contact 32 has moved downward sufficiently to separate the moving and stationary contacts 32, 34 causing the resistor current flow 70 to again flow through the resistor 42. As the moving contact 32 continues further downward, the moving contact separates from the resistor contact 36 causing a spinning arc to develop between in the arc gap 40 between the moving contact and the resistor contact. This helps extinguish the arc as the moving contact continues to the fully lowered position shown in FIG. 12. The open switch 64 is then opened to de-energize the open coil 24, as shown in FIG. 13. It will be noted that position of the switch shown in FIG. 13 is the same as FIG. 3.

Figure 14:
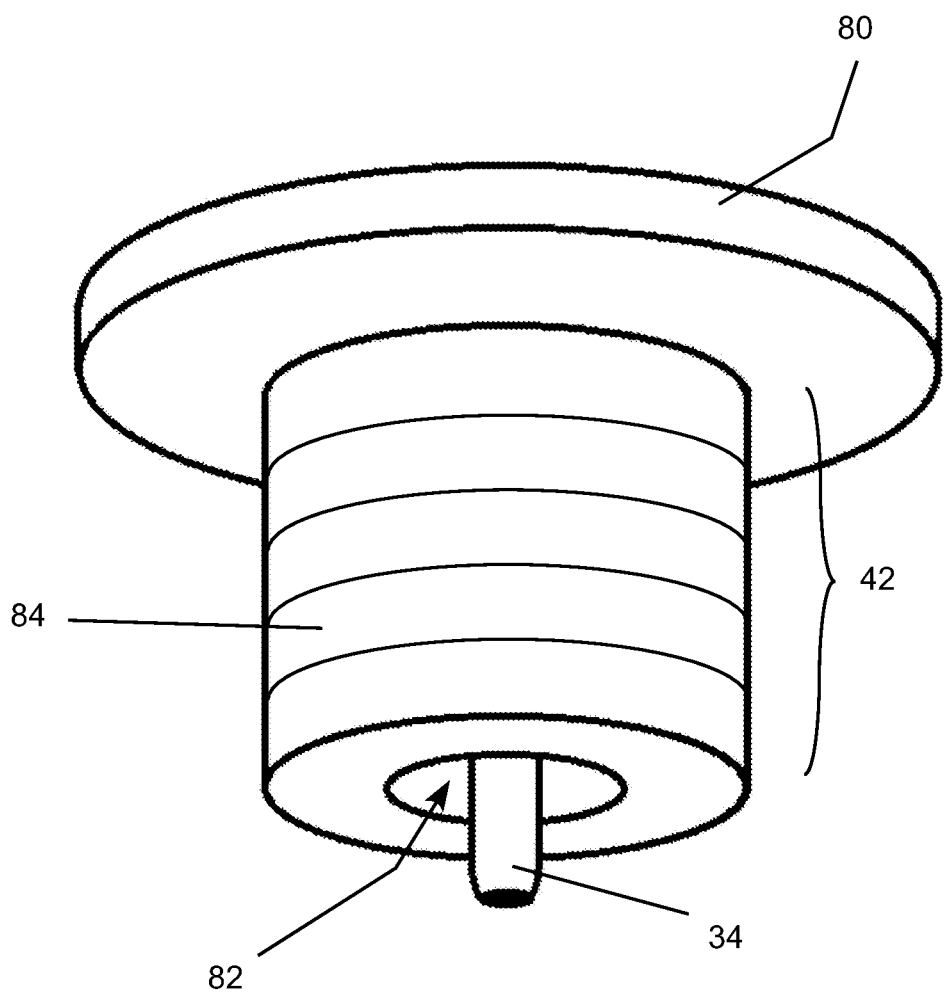
FIG. 14 is a conceptual of a hanging ballast resistor and stationary contactor of the sealed solenoid circuit switch.

FIG. 14 is a conceptual illustration of an embodiment of the ballast resistor 42, which surrounds the stationary contact 34. In this particular embodiment, the ballast resistor 42 is formed from a composite material allowing the resistor to hang from a flange 80 without having to be compressed like many conventional ballast resistors. The resistor 42 is configured to be located inside the sealed container formed by the insulator 12 to avoid the need for an additional external housing structures typically used for ballast resistors in electrical power switches. The ballast resistor 42 has an annular shape forming a central channel 82 with the stationary contact 34 located partially within the channel. In this particular embodiment, the stationary contact extends below the bottom of the ballast resistor.

The resistor 42 may include several disk shaped annular resistor pucks represented by the resistor puck 84 bonded together concentrically by a bonding agent to form a resistor stack. The resistor pucks are typically located between conductive end plates held together to form the resistor stack with a cold or heat sealed adhesive, but may also be held together with non-magnetizing bolts, straps, ties or another suitable fastener as a matter of design choice. The assembled resistor stack 42 is concentrically aligned with the stationary main contact 34 and fastened to the flange 80 again typically using a cold or heat sealed adhesive or another suitable fastener. The resistor assembly, once paired with an appropriate resistor contact assembly 36, is ready to be applied in electrical power switching as a way to switch power while damping switching current spikes and transients typically associated with electrical power switching.

Figure 15:
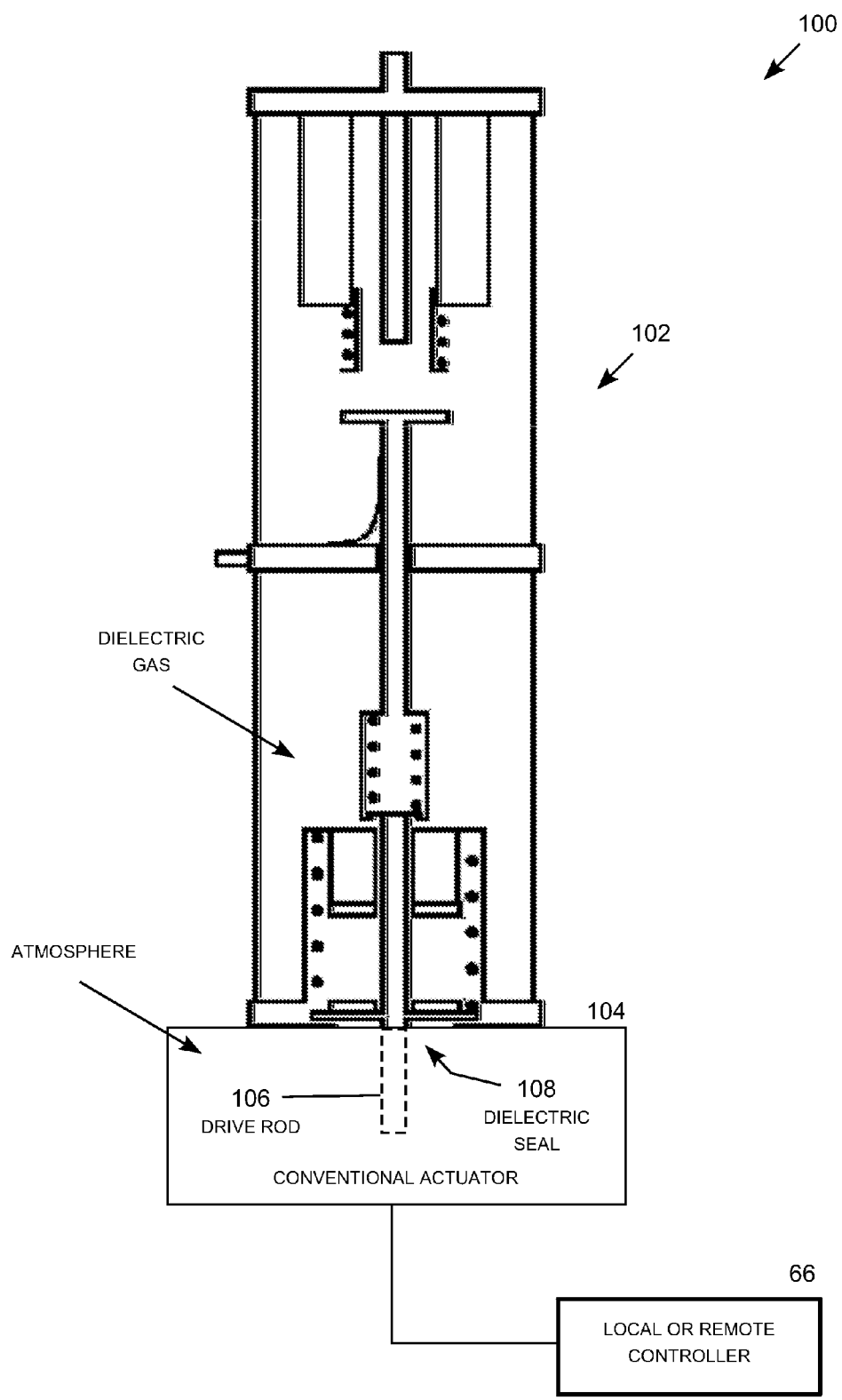
FIG. 15 is a schematic diagram of an alternative embodiment utilizing a conventional actuator well suited for use as a retrofit or upgrade switch at existing installations.

FIG. 15 is a schematic diagram of an alternative embodiment 100 utilizing a conventional actuator well suited for use as a retrofit or upgrade switch at existing installations. The switch 100 includes a dielectric switch 102 that is similar to the switch 10 described previously except that the magnetic actuator has been replaced by a conventional actuator 104, which may be controlled in any suitable manner, for example with the same type of local or remote controller 66 described previously for controlling the switch 10. Utilizing the conventional actuator 104, which may be part of an existing switch, makes this alternative particularly well suited for use as a retrofit or upgrade switch at existing installations. The conventional actuator 104 may be a spring toggle mechanism well known in this field of technology in which the mechanism connects to a moving drive rod 106 that extends through a wall of the sealed container. This approach therefore utilizes a dielectric seal 108 around the drive rod to allow the drive rod to move while extending across a wall of the sealed container. While the magnetic actuator avoids this seal, the alternative embodiment 100 including this seal possesses may other innovations and advantages of the design. In particular, combinations of many other design features, including the annular spring loaded resistor contact positioned concentrically with the main stationary contact, the moving contact serving as a butt contact for the resistor contact as well as a butt or penetrating contact for the main stationary contact, the spinning arc formed between the moving contact and the resistor contact, and the ballast resistor located inside the sealed container and positioned concentrically around at least a portion of the main stationary contact, produce advantages reducing the size, weight, cost and complexity of the alternative switch 100 compared to conventional designs.

It will be further understood that the foregoing describes a preferred embodiment of the invention and that many adjustments and alterations will be apparent to those skilled in the art within the spirit and scope of the invention as defined by the appended claims.

The invention claimed is:

1. A sealed solenoid, mechanically operated, high voltage electric power switch, comprising:
   a high voltage insulator forming a sealed container filled with a dielectric gas;
   a contactor located within the container movable into and out of electrical connection to selectively connect a line terminal with a load terminal to open and close an electric power circuit through operation of the switch, wherein the line terminal and the load terminal extend from outside to inside the container and are stationary with respect to the container;
   an actuator located outside the container and positioned to magnetically couple with the contactor to selectively move a portion of the contactor in an opening stroke between a closed position and an open position, and in a closing stroke between the open position and the closed position; and
   a non-magnetizing container wall separating the contactor and the actuator to provide magnetically coupled operation of the contactor without a moving physical element extending through the container wall.

2. The electric power switch of claim 1, further comprising a ballast resistor located within the container.

3. The electric power switch of claim 2, further comprising a ballast resistor contact located within the container and positioned come into electrical contact with a moving contact during the opening and closing strokes while the moving contact is located between the open and closed positions and the moving contact is not in electrical connection with a stationary contact to temporarily enter the resistor into the circuit to dampen switching current spikes and transients.

4. A sealed solenoid, mechanically operated, high voltage electric power switch, comprising:
   a high voltage insulator forming a sealed container filled with a dielectric gas;
   a high voltage contactor having a moving contact and a stationary contact located within the container movable into and out of electrical connection to selectively connect a line terminal with a load terminal to open and close an electric power circuit through operation of the switch, wherein the line terminal and the load terminal extend from outside to inside the container and are stationary with respect to the container;
   an armature located within the container physically linked to the movable contact;
   an actuator located outside the container and positioned to magnetically couple with the armature to selectively move the armature and thereby move the moving contact, the moving contact movable in an opening stroke between a closed position and an open position, and in a closing stroke between the open position and the closed position, wherein the moving contact is not in electrical contact with the stationary contact in the open position, and the moving contact is in electrical contact with the stationary contact in the closed position;
   a non-magnetizing container wall separating the armature and the actuator to provide magnetically coupled operation of the contactor without a moving physical element extending through the container wall.

5. The electric power switch of claim 4, wherein the high voltage contactor comprises a penetrating contactor in which the stationary contact comprises a pin-type male contact and the moving contact comprises a female contact configured to allow the male contact to penetrate into a hole in the female contact.

6. The electric power switch of claim 4, further comprising:
a ballast resistor;
a resistor contactor located within the container and positioned come into electrical contact with the moving contact during the opening and closing strokes while the moving contact is located between the open and closed positions and the moving contact is not in electrical connection with the stationary contact to temporarily enter the ballast resistor into the circuit to dampen switching current spikes and transients.

7. The electric power switch of claim 6, wherein the resistor contact and the moving contact are similarly sized and positioned adjacent to each other to cause an arc that forms between the contacts to circulate during the opening and closing strokes.

8. The electric power switch of claim 7, wherein the ballast resistor is located within the container.

9. The electric power switch of claim 8, wherein the ballast resistor has an annular shape forming a central channel and the stationary contact is located at least partially within the channel.

10. The electric power switch of claim 9, wherein the resistor contact is annular, positioned at least in part around the stationary contact, spring loaded, and configured to retract as the moving contact comes into contact with the resistor contact on the closing stroke.

11. The electric power switch of claim 4, wherein the actuator comprises a pair of coils positioned to magnetically couple with the armature across the armature wall and includes a closing coil configured to move the armature from the open position to the closed position when energized and an opening coil configured to move the armature from the closed position to the open position when energized.

12. The electric power switch of claim 11, further comprising a controller comprising an opening switch configured to selectively energize the opening coil and an closing switch configured to selectively energize the closing coil.

13. The electric power switch of claim 4, further comprising a magnetic latch to selectively hold the switch in the closed position without an energizing current and a return spring configured to selectively hold the switch in the open position without an energizing current.

14. The electric power switch of claim 13, further comprising a resistor contact spring that is compressed when the contactor is in the closed position.

15. The electric power switch of claim 14, further comprising a return spring configured to assist in accelerating the moving contact during the opening stroke that is compressed when the contactor is in the closed position.

16. The electric power switch of claim 15, further comprising a linear spring joint in a linkage between the armature and the moving contact to mechanically dampen impacts between the moving contact and other components of the switch.

17. The electric power switch of claim 16, wherein the magnetic latch is sufficiently strong to maintain the switch in the closed position without an energizing current against gravity and the spring compression of the resistor spring, the return spring, and the linear spring joint.

18. A high voltage electric power switch, comprising:
a high voltage insulator forming a sealed container filled with a dielectric gas;
a high voltage contactor having a moving contact and a stationary contact located within the container movable into and out of electrical connection to selectively connect a line terminal with a load terminal to open and close an electric power circuit through operation of the switch, wherein the line terminal and the load terminal extend from outside to inside the container and are stationary with respect to the container;
wherein the moving contact is movable in an opening stroke between a closed position and an open position, and in a closing stroke between the open position and the closed position, and wherein the moving contact is not in electrical contact with the stationary contact in the open position, and the moving contact is in electrical contact with the stationary contact in the closed position;
a non-magnetizing container wall separating the contactor and an actuator to provide magnetically coupled operation of the contactor without a moving physical element extending through the container wall; and
a ballast resistor contact located within the container and positioned come into electrical contact with the moving contact during the opening and closing strokes while the moving contact is located between the open and closed positions and the moving contact is not in electrical connection with the stationary contact to temporarily enter the resistor into the circuit to dampen switching current spikes and transients.

19. The electric power switch of claim 18, wherein the resistor contact is annular, positioned at least in part around the stationary contact, spring loaded, and configured to retract as the moving contact comes into contact with the resistor contact on the closing stroke.

20. The electric power switch of claim 19, wherein the ballast resistor is annular and positioned at least in part around the stationary contact adjacent to the resistor contact.

\* \* \* \* \*